Oct. 14, 1952 J. O. EDSON ET AL 2,614,141
COUNTING CIRCUIT
Filed May 26, 1950 3 Sheets-Sheet 1

INVENTORS: J. O. EDSON
J. G. KREER, Jr.
BY  N. D. Ewing
ATTORNEY

Oct. 14, 1952   J. O. EDSON ET AL   2,614,141
COUNTING CIRCUIT
Filed May 26, 1950   3 Sheets-Sheet 2

INVENTORS J. O. EDSON
J. G. KREER, Jr.
BY N. D. Ewing
ATTORNEY

Oct. 14, 1952     J. O. EDSON ET AL     2,614,141
COUNTING CIRCUIT

Filed May 26, 1950     3 Sheets-Sheet 3

INVENTORS J. O. EDSON
J. G. KREER, Jr.
BY N. A. Ewing
ATTORNEY

Patented Oct. 14, 1952

2,614,141

UNITED STATES PATENT OFFICE 2,614,141

COUNTING CIRCUIT

James O. Edson, Warren Township, Somerset County, and John G. Kreer, Jr., Bloomfield, N. J., assignors to Bell Telephone Laboratories, Incorporated, New York, N. Y., a corporation of New York Application May 26, 1950, Serial No. 164,362

9 Claims. (Cl. 171—97)

This invention relates, in general, to signal translation systems of the type using as their active elements units having a negative resistance characteristic and, more specifically, to ring circuits using these elements.

It is the general object of this invention to improve ring counter circuits. A more specific object of the invention is to provide counter circuits which include a minimum number of components and, particularly, small-dimensional components having low power requirements.

The ring counter circuits disclosed hereinafter employ certain triggering techniques disclosed hereinafter employ certain triggering techniques by J. G. Kreer in his application Serial No. 164,361, filed concurrently herewith, and certain improvements thereon disclosed by J. O. Edson in his application Serial No. 164,363, filed concurrently herewith.

As used in the specification and claims hereinafter, the term "ring counter" means a circuit comprising a plurality of stages, each of which has more than one state of stability and wherein each of the stages advances from one state of stability to another in regular timed relation under control of impulses applied to the circuit.

The ring counter circuit of the subject invention is characterized by the use of a plurality of current-conducting paths or circuit meshes, in each of which the current flows continuously but in unequal amounts. Each of these paths employs a variable resistance element which may be either voltage controlled or current controlled. These variable resistance elements are characterized by voltage-current characteristics which, when graphically displayed, take the form of an N curve in the case of the current-controlled type and an S curve in the case of the voltage-controlled type. In either type, as the current through the unit or the voltage impressed upon the unit, as the case may be, is progressively increased from zero to some maximum value, there is traversed a first region of positive resistance and a second region of positive resistance, separated by an intermediate region of negative resistance. The current-controlled units are sometimes referred to as series-type units or open-circuit-stable units, whereas the voltage-controlled units are sometimes referred to as shunt-type or short-circuit-stable units. In either type, the unstable negative resistance region is not experimentally observed unless, for example, in the case of the series type, the variable resistance unit is connected in series with an auxiliary impedance element having a resistance of greater magnitude than the maximum negative resistance or, in the case of the shunt type, the variable resistance unit is connected in parallel with an impedance element having a resistance value less than the minimum negative resistance value of the variable resistance unit. As used in the ring circuits of the present invention, the negative resistance units are connected with auxiliary impedance units of such magnitude that the negative resistance region is unstable.

In the specification which follows, there are shown current-voltage characteristic graphs which are representative for both the series- and shunt-type variable resistance units. In the region between maximum and minimum voltage, the graph of the series-type unit, which is an N-shaped curve, shows three theoretically possible values of current for a given value of voltage across the unit. The characteristic graph of the shunt-type unit is an S-shaped curve which shows three theoretically possible values of voltage for a given value of current. Thus, when the variable resistance unit is combined with an auxiliary impedance unit of the proper magnitude, there exists a region of instability in which an increase in one factor, be it current or voltage, produces a decrease in the other factor. It is this characteristic of the negative resistance unit that is utilized in the ring counter circuits of the present invention.

In the circuit embodiments of the present invention, which are described hereinafter, a plurality of these variable resistance units are arranged in individual circuit meshes in which continuous currents flow. The circuit potentials and connected resistors are adjusted to such values that each variable resistance unit would be operated in its negative resistance region if that condition were a stable one. If each variable resistance unit is associated with an additional impedance element, the value of which is chosen such that the region of negative resistance is unstable, it is possible to arrange the circuit in accordance with the teachings of the present invention so that the current flowing in one circuit branch of the ring will always be larger than that flowing in the remaining branches and will be of such magnitude that the one negative resistance conducting path is operated in its second or upper region of positive resistance, while the others are simultaneously operated in their first or lower region of positive resistance. Each of the aforesaid circuit meshes is interconnected with the next adjacent mesh of the ring through a "memory" or storage circuit which stores energy in accordance with a difference in current flow between two adjacent negative resistance units. Provision is made for intermittently or periodically forcing all of the variable resistance units to momentarily operate in their first or lower positive resistance region. This momentary disturbance promotes redistribution of the energy stored in the "memory" circuits on both sides of the high-current branch and causes a revision of the current-conduction states in the variable resistance units. Each of the aforesaid "memory" or storage circuits includes a unidirectional current-conducting element which is poled to determine the counting direction of the ring by controlling the direction of distribution of the stored energy from one mesh to the next adjacent mesh, whereby the previously high-current branch becomes a low-current branch, and the next adjacent branch in the stepping direction conducts high current. This revised current condition prevails until a second disturbance again promotes another energy redistribution and another current-conduction revision, whereupon the high-current condition moves around the ring another stage in the selected direction.

As pointed out hereinbefore, in its more general aspects, the invention falls into two categories, depending on whether the variable resistance units to be used are of the series or shunt type. If the variable resistance units are of the series type, they are employed in a circuit configuration comprising as many parallel conduction paths as there are to be stages in the ring counter circuit. Each such conducting path consists of a series-type negative resistance unit connected in series with a padding resistor. In one of the disclosed embodiments, the conducting paths are interconnected by capacitors in series with a rectifying-type varistor which is poled to conduct current in the direction in which the ring is to count. In another of the disclosed embodiments, which includes series-type variable resistance elements, an inductor is connected in series with each of the storage capacitors for the purpose of providing optimum delay.

Current is supplied to the combination of parallel conduction paths and interconnecting circuits from a direct-current source through a resistor proportioned so as to maintain the current into the combination between appropriately specified limits. In series with this direct-current source, there is connected a source of current pulses capable of reducing the input current by an appropriately specified amount.

If the variable resistance units are of the shunt type, then each is shunted by a padding resistor through an inductor in parallel with a rectifying element, and a number of such sections are connected in series across a battery having a connected limiting resistor which is so proportioned that the voltage across the series combination is maintained within the appropriately specified limits. A source of voltage pulses capable of reducing the terminal voltage by an appropriately specified amount is connected in circuit relation with the battery and the limiting resistor.

Under the specified conditions, current will flow through all the negative resistance units simultaneously but in such manner that one of the negative resistance units is in a different portion of its characteristic from all of the remaining ones. When pulses are applied to the circuit, the abnormal state is caused to move in a regular manner around the ring in a direction which is determined by the polarity of the varistors in the coupling elements.

Details of the invention and the manner in which the invention accomplishes the objects hereinbefore mentioned will be more clearly understood from a consideration of the following description when considered in conjunction with the drawings, in which.

Figure 1:
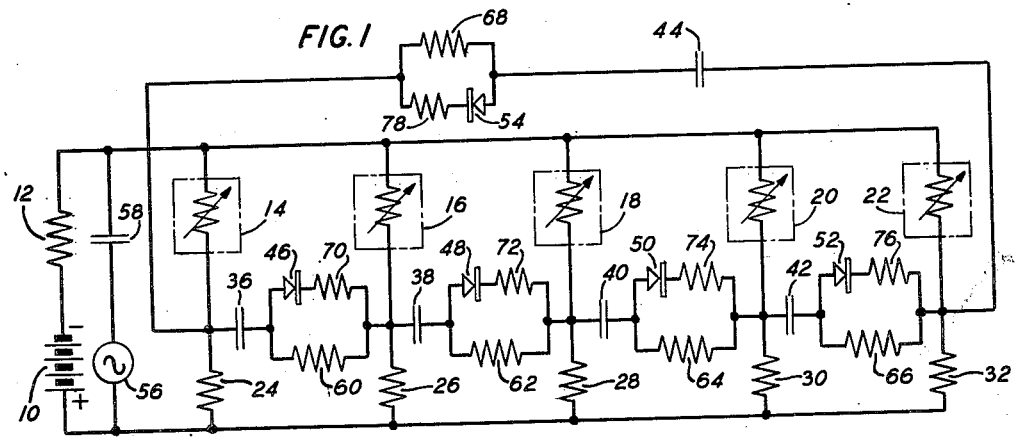
Fig. 1 is a schematic circuit arrangement of a five-stage ring circuit in which the variable resistance elements are of the series type.

Referring in detail to Fig. 1, there is disclosed the arrangement of a ring counter circuit in accordance with the invention in which a current source or battery 10 supplies current through a current-limiting resistor 12 to the substantially identical series-type variable resistance elements 14, 16, 18, 20, and 22, which elements are here symbolically shown as variable resistances enclosed in broken line rectangles. Variable resistors 14, 16, 18, 20, and 22 may be any of a variety of known arrangements, such as arc discharge devices, ionic discharge devices, electronic discharge devices, or non-ohmic semiconductive substances such as germanium crystals or the well-known heat treated oxides of manganese, cobalt, or other suitable metals, which have been given the generic title of "varistors." In this described embodiment, it will be assumed that the elements 14, 16, 18, 20, and 22 are thin film resistors of the type known as "flake-type thermistors," which are described in Patent 2,414,793, January 28, 1947, to J. A. Becker. It should, however, be understood that variable resistors 14, 16, 18, 20, and 22 may equally well be other types of known non-ohmic semiconductor substances, whether in flake or pad form, or in the form of point-type crystal rectifiers, such as the germanium diode, so long as they possess a region of negative resistance in their current-voltage characteristic.

Figure 2:
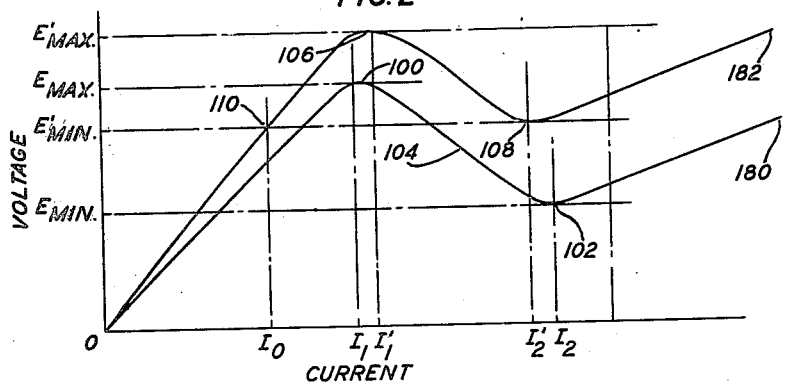
Fig. 2 is a graphic representation of the current-voltage characteristic of a typical series-type variable resistance element, to which reference will be made in the following detailed explanation.

It is thus seen that for the purposes of the present invention, it is sufficient if each of the elements 14, 16, 18, 20, and 22 have current-voltage characteristics which take the form of the N-shaped curve indicated in Fig. 2, wherein a region of negative resistance is flanked by two regions of positive resistance. Within the negative resistance region, there are three theoretically possible values of current through the unit for a single value of voltage across it. The current-limiting resistor 12, which is included in the circuit in series between the direct-current potential source 10 and the common junction of the variable units 14, 16, 18, 20, and 22, serves, in conjunction with the other circuit impedances, to limit the maximum value of current that can flow from the source 10. The substantially identical padding impedances or resistors 24, 26, 28, 30, and 32 are connected in series between each of the respective resistance elements 14, 16, 18, 20, and 22 and the lower terminal of the source 10. The junction point between each of the variable units 14, 16, 18, 20, and 22 and its respective padding resistors 24, 26, 28, 30, and 32 is interconnected with a similar junction in the next adjacent stage through a storage or "memory" circuit, which includes a respective one of the capacitors 36, 38, 40, 42, and 44 in series with a parallel circuit, one of whose branches includes one of the rectifying diodes 46, 48, 50, 52, and 54 in series with one of the resistors 70, 72, 74, 76, 78, and the other branch of which includes a respective one of the resistors 60, 62, 64, 66, 68.

The pulse generator 56 is connected between the common lower junction of the padding resistors 24, 26, 28, 30, and 32 through an impedance which takes the form of the capacitor 58 to the common junction between the limiting resistor 12 and the variable units 14, 16, 18, 20, and 22. This generator is poled oppositely to the polarity of the battery 10 such that when it delivers voltage pulses through the low impedance path provided by the capacitor 58, the current flow in the variable resistance units 14, 16, 18, 20, and 22 is accordingly reduced. Because of the low impedance character of the pulse path through the capacitor 58, a given pulse voltage produces in the variable resistors 14, 16, 18, 20, and 22 greater currents than are produced by the same voltage from the source 10.

The general principles governing the choice of suitable values for current source or battery 10, the current limiter 12, the padding resistors 24, 26, 28, 30, and 32, the shunting capacitor 58, and the elements of the interconnecting storage circuits will be explained with reference to the N-shaped curve indicated in Fig. 2. Referring to that figure, curve 180 indicates the manner in which the voltage across a series-type or current-controlled variable resistance unit changes as the current flowing through the unit is varied. This curve is representative of the general class of series-type units and is not individual to any specific one. It is indicative, for example, of the variation that would be noted across a thin film resistor of the type described in the Becker patent, supra.

From this curve, it will be noted that the unit has a region of negative resistance, indicated by the portion between reference numerals 100 and 102, in which an increase of current produces a corresponding decrease in voltage across the unit. This region of negative resistance is flanked on the left by a first region of positive resistance, as indicated, from zero to numeral 100, and is flanked on the right by a second region of positive resistance to the right of reference numeral 102. These first and second regions are occasionally referred to as the low-current and high-current regions of positive resistance, respectively. There is only one appropriate value of voltage for any specific value of current flowing through the resistor, but for any given voltage drop across the resistor, there may be as many as three appropriate values of current flowing in it. The maximum voltage, which is indicated by point 100 on the curve 180 of Fig. 2, will be hereinafter designated $E_{max}$ and occurs when a current, hereinafter designated $I_1$, flows through one of the described negative resistance units; and the minimum voltage, indicated by the point 102 on the curve 180, will be hereinafter designated $E_{min}$ and occurs when a current, hereinafter designated $I_2$, flows through one of the described variable resistance units. For currents less than $I_1$ or greater than $I_2$, the slope of the characteristic is positive, whereas for currents in the interval between $I_1$ and $I_2$, the slope of the characteristic is negative. Because the negative resistance region indicated between the reference numerals 100 and 102 is a region in which a change in the current flowing through the device produces an oppositely directed change in the voltage across it, it is a region of instability and is not one in which the current flow will come to rest unless the negative resistance unit is in series connection with a stabilizing resistance of sufficiently great value. If the value of the stabilizing resistor is greater than the maximum negative resistance of the negative resistance unit, any current value may be stably maintained. At some point, such as 104, within the interval between the points 100 and 102 on the curve 180, the characteristic will have a negative slope of maximum absolute value; this maximum negative slope will be designated $R_{max}$. If this series-type negative resistance unit is in series connection with a resistor, the magnitude of which is less than the maximum negative resistance of the unit $R_{max}$, the composite circuit will have a characteristic such as indicated by the curve 182 of Fig. 2.

Accordingly, the padding resistors 24, 26, 28, 30, and 32 are preferably chosen from a range of values which is less than $R_{max}$. Under this restriction, the composite characteristic, as indicated by the curve 182, will have a maximum voltage, indicated by the numeral 106, which is designated $$E'_{max}$$

and a minimum voltage, indicated by the numeral 108, designated $$E'_{min}$$

with corresponding currents respectively designated $I'_1$ and $I'_2$. One other point of the composite characteristic which will be referred to in the following explanation is the point on the low-current positive slope portion of the characteristic, designated 110 on curve 182, at which the voltage is equal to $$E'_{min}$$

The current at this point will be designated $I_0$. The source of potential 10 and the current-limiting resistor 12 are preferably chosen from a range of values which satisfy the following inequality:

$$\frac{E_{10}-E_{min}}{2I_2'+(n-2)I_0} < R_{12} < \frac{E_{10}-E'_{max}}{nI_1'} \qquad (1)$$

in which $E_{10}$ is the voltage of the source 10, $R_{12}$ is the resistance value of the resistor 12, and $n$ is the number of stages in the ring circuit (five in the illustrative embodiments described herein).

The diodes 46, 48, 50, 52, and 54, which may assume any of the forms of rectifiers well known in the art, preferably have a resistance in the conducting direction which may be determined by trial to give the greatest stability for the final operation of the circuit. This is represented in each of the stages by the resistors 70, 72, 74, 76, and 78, connected in series with the respective diodes 46, 48, 50, 52, and 54. The purpose of resistors 70 through 78 is to produce a differential between the driving pulses impressed on the stages in favor of the stage which is to become active. The capacitors 36, 38, 40, 42, and 44 are so chosen that when the diode is conducting, the time constant of each mesh is approximately equal to the time required for the negative resistance units to change from the operating conditions in which the current is greater than $I'_2$ to that in which the current is less than $I'_1$. Resistors 60, 62, 64, 66, and 68 are then chosen so that in the interval when the diodes do not conduct, the time constant for each mesh is somewhat shorter than the shortest interval between pulses to be counted but appreciably longer than the time constant that exists in the interval in which the diodes 46, 48, 50, 52, and 54 are operating in a conducting condition. The pulse generator 56 is preferably capable of introducing current pulses of sufficient magnitude to reduce the current in the high-current unit of the ring to less than $I_2$ and of a duration of approximately the time required for the negative resistance units to change their state of condition. As pointed out above, in accordance with the teachings of application Serial No. 164,363, supra, the capacitor 58 is made sufficiently large to provide a low impedance path for the pulses.

The manner in which the ring counter circuit of Fig. 1 operates may be described as follows. Because of the limitation imposed by the inequality (1) hereinabove, at any one time only one of the variable resistance units will conduct current having a value greater than $I'_2$, while the remainder of the units will conduct currents having a value between $I_0$ and $I'_1$, the actual current value within these limits being determined by the actual values of potential of battery 10 and resistance of the unit 12. Let us assume that the variable resistor 14 is the one which is carrying high current. Then, the capacitors 36 and 44 will be charged to a potential which is equal to the difference in the potential drop across the resistor 24 and the potential drops across the resistors 26 and 32. Capacitors 38, 40, and 42 will remain uncharged. If the pulse generator 56 now supplies a pulse of such magnitude as to reduce the total current to a sufficient extent, variable resistor 14 will transfer operation to its low-current state. The capacitor 36 will then discharge through the padding resistor 24 and also through a path including the diode 46 in series with resistor 70 and the padding resistor 26, raising the potential drop across the negative resistor 16. The discharge of capacitor 44 tends to raise the potential drop across resistor 32, but the direction of current flow is such that diode 54 does not conduct; hence, the potential developed across resistor 32 is less than that developed across resistor 26. Thus, when the pulse ends, unit 16 will be the first to have its potential made greater than $E'_{max}$ and, hence, will transfer to operation in the high-current state. During the interval between pulses, capacitor 44 discharges through the resistor 68, while the capacitors 36 and 38 charge. The condition is then the same as the starting condition except that the high conductive state has been moved one stage around the ring. This procedure is repeated on successive pulses, each of which moves the high conduction state one step around the ring.

Figure 3:
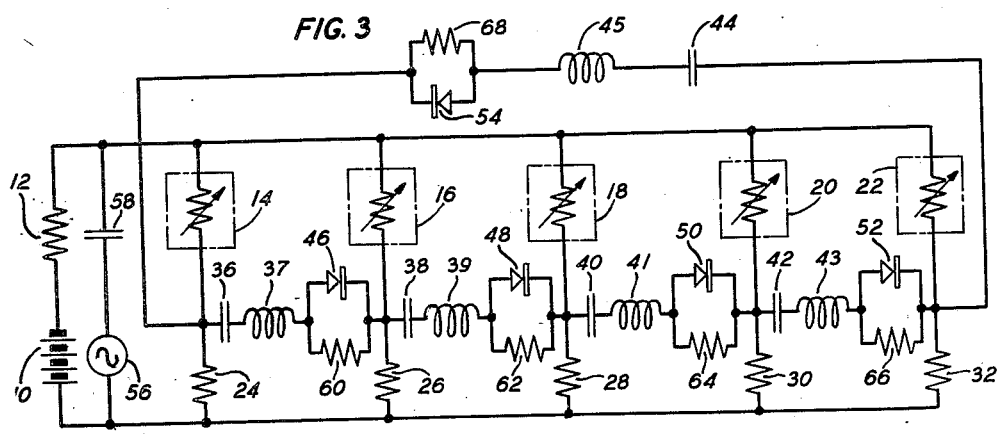
Fig. 3 is a schematic circuit arrangement of a five-stage ring circuit in accordance with the present invention, in which the variable resistance elements are of the series type and wherein the interconnecting storage circuits are critically damped.

Referring now to Fig. 3 of the drawings, the construction and operation of the embodiment there shown is largely similar to that of Fig. 1 indicated above, the principal difference being in the configuration of the storage circuits interconnecting the junctions between each negative resistance element and its padding resistor with a similar junction in the next adjacent mesh. In addition to the capacitors 36, 38, 40, 42, and 44, the aforesaid storage circuits include inductors 37, 39, 41, 43, and 45, each of which is connected in series between one terminal of the corresponding capacitor and the one of the parallel circuits which respectively contain the diodes 46, 48, 50, 52, and 54 and their parallel resistors 60, 62, 64, 66, and 68.

The purpose of inductors 37, 39, 41, 43, and 45 is to delay the transfer pulses impressed on successive stages as well as reducing their magnitude so that the desired stage will take control before any of the subsequent stages have a tendency to transfer to the high-current state. This is accomplished by designing each inductor and its associated capacitor to have a resonant frequency which is approximately four times the length of the driving pulses. The damping is designed to be critical so that the maximum of the transfer pulse will be impressed on the appropriate stage immediately.

Figure 4:
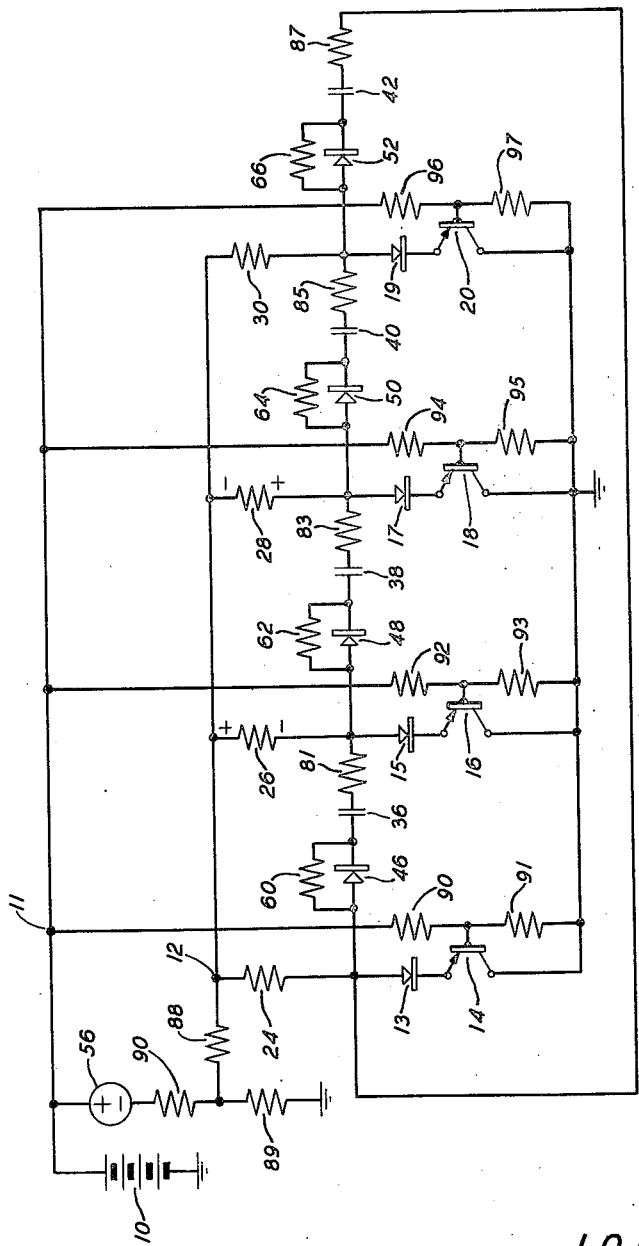
Fig. 4 is a schematic circuit arrangement of a four-stage ring circuit in accordance with the present invention in which transistors connected as dipoles serve as the active elements of the circuit.

Fig. 4 shows a schematic arrangement of an additional embodiment of the invention in which each of the variable resistance units 14, 16, 18, 20 comprises a semiconductor triode of the type commonly known in the art as a "Transistor," which is described and claimed in Patent 2,524,035, issued October 3, 1950 jointly in the names of John Bardeen and W. H. Brattain. Each of these units comprises a small block of semiconductor material, such as N-type germanium, with which are associated three electrodes. One of these, known as the base electrode, makes low resistance contact with one face of the germanium block. This may take the form of a plated metal film. The other electrodes, termed the "emitter" and "collector" electrodes, preferably make point-type contacts with the other face of the block. In the present embodiment, each of the units is connected so that the circuit to the base electrode has a resistance that is high relative to the circuit to the emitter electrode. Under these conditions, as described in H. L. Barney Patent 2,585,078, issued February 12, 1952, the transistor is characterized by a ratio of short-circuit collector current increments to corresponding emitter current increments which substantially exceeds unity for electrode current-voltage conditions within a preassigned range of values, whereby a voltage-current characteristic is produced which has a negative slope within certain limits, such as indicated by curve 131 of Fig. 5. When such a semiconductor triode is connected with its emitter in series with a germanium diode and an auxiliary resistor, such as shown in Fig. 4, the voltage-current characteristic assumes the form indicated by curve 132 of Fig. 5. The diode functions to steepen the characteristic to the left of the origin, a feature which is particularly desirable in a ring circuit including a large number of stages.

Accordingly, the emitter of each of the transistors 14, 16, 18, 20 is connected to a common junction 12 through an individual circuit, each of which includes a resistor 24, 26, 28, 30 in series with the appropriate diode 13, 15, 17, 19. The junction 12 is connected to the positive terminal of the direct-current positive potential source 10 through a circuit which includes resistors 88 and 87, the junction between which is grounded through the resistor 89 and pulse generator 56. The polarity of pulse generator 56 is such as to reduce the direct-current potential applied to the circuit from source 10.

Resistors 90, 92, 94, 96, and 91, 93, 95, 97 are connected in pairs in the successive stages to form a plurality of parallel potential dividers which extend between ground and the junction 11 at the positive terminal of the battery 10. The base electrode of each of the transistors 14, 16, 18, 20 is connected at the junction between the appropriate pair of resistors 90, 92, 94, 96 and 91, 93, 95, 97. The collector in each unit is connected directly to ground.

As in previous embodiments, each stage is connected to the next adjacent stage through a storage circuit which includes the appropriate diode 46, 48, 50, 54 shunted by the corresponding resistor 60, 62, 64, 66 in series with an RC circuit which includes the appropriate capacitor 36, 38, 40, 42 and series resistor 81, 83, 85, 87.

In the tested embodiment of Fig. 4, suitable values of designated components were designated to be as follows:

| | |
|---|---|
| Battery 10 | 150 volts |
| Pulse generator | 39–50 volts |
| Current-limiting resistor 87 | 24,000 ohms |
| Resistor 88 | 2,000 ohms |
| Resistor 89 | 12,000 ohms |
| Resistors 24, 26, 28, 30 | 7,500 ohms |
| Resistors 90, 92, 94, 96 | 23,000 ohms |
| Resistors 91, 93, 95, 97 | 9,500 ohms |
| Resistors 60, 62, 64, 66 | 75,000 ohms |
| Condensers 36, 38, 40, 42 | .00033 microfarad |
| Resistors 81, 83, 85, 87 | 11,000 ohms |

Figure 5:
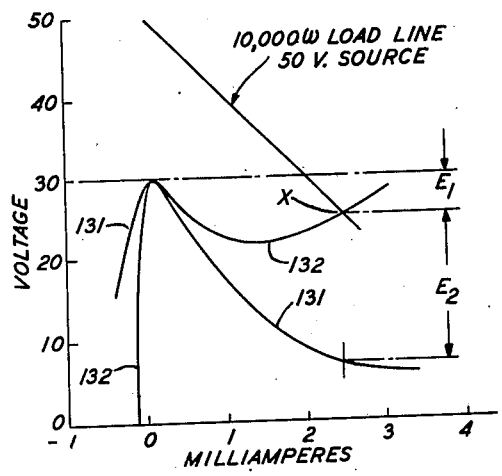
Fig. 5 is a graphic representation of the current-voltage characteristic of one of the transistor stages of Fig. 4.

Typical operation of the circuit will now be traced, on the assumption that stage 2 is initially conducting current to the exclusion of stages 1, 3, and 4. Under this condition, the difference in potential between the upper end of the resistor 26 and ground will be that indicated at point X in Fig. 5. Thus, this is the voltage which is applied to the other three transistors not in current-conducting condition. If for some reason the potential at X should increase beyond the peak voltage existing on some other unit or if the peak potential of another unit is reduced below the potential existing at the upper end of resistor 26, then this other transistor will conduct current, making two stages conducting simultaneously. It is thus apparent that the voltage $E_1$, indicated in Fig. 5, is a measure of the margin against false operation and must therefore be carefully controlled. The means by which the ring circuit advances will now be described.

It is apparent that a voltage corresponding to $E_2$, as indicated in Fig. 5, exists across the resistor 26 and acts to charge the capacitors 36 and 38 in the coupling circuits. The capacitors in the other coupling circuits remain substantially uncharged. When a negative pulse occurs, the load line indicated on Fig. 5 is effectively moved in a negative direction sufficiently far to cause all transistors to be on that part of the characteristic to the left of the origin, that is, in a very high resistance region. Thus, all the emitter circuits, in series with the diodes 13, 15, 17, 19, act effectively like open circuits at this time. Most of the voltage on coupling capacitor 36 now appears across the high resistance element 60 inasmuch as the germanium diode 46 in the coupling circuit between stages 1 and 2 is in a non-conducting direction during the time the pulse is on. The voltage on coupling capacitor 38, however, causes current to flow around the path consisting of capacitor 38, resistors 83, 28, and 26, the germanium diode 48 conducting in a forward direction in this case. Thus, a substantial voltage is developed across the series resistor 28 in stage 3, the polarity of which is shown by the encircled positive and negative signs in Fig. 4. When the pulse again allows the voltage on the common point 12 to be reestablished, the voltage drop across resistor 28 causes a favorable bias to be placed upon the transistor 18 in stage 3, thereby causing it to conduct a high current before any of the other transistors reach the conducting region. Thus, the transistor of stage 3 takes control in the manner in which stage 2 had control. The ring circuit has therefore advanced from stage 2 to 3 by the application of a negative pulse. Capacitor 38 charges quite rapidly, inasmuch as the charging path passes through the germanium diode 48 in a forward direction. The charging of capacitor 40, however, is not so rapid, inasmuch as the diode 50 in its charging path is in the reverse direction, causing the charging to occur through the relatively high diode shunting resistor 64. Before application of the next negative pulse, sufficient time is allowed to substantially charge capacitor 40 to full voltage.

The inclusion of the resistors 81, 83, 85, 87 is desirable, inasmuch as it is observed that the voltage developed across resistor 28 is of such polarity that in the absence of some differentiating device, this voltage would be passed on in succession to stage 4 and stage 1, through the coupling diodes in a forward direction. Therefore, the resistors 81, 83, 85, 87 serve to provide a higher biasing voltage across the stage next succeeding the active stage than across any of the other stages following in the ring.

Figure 6:
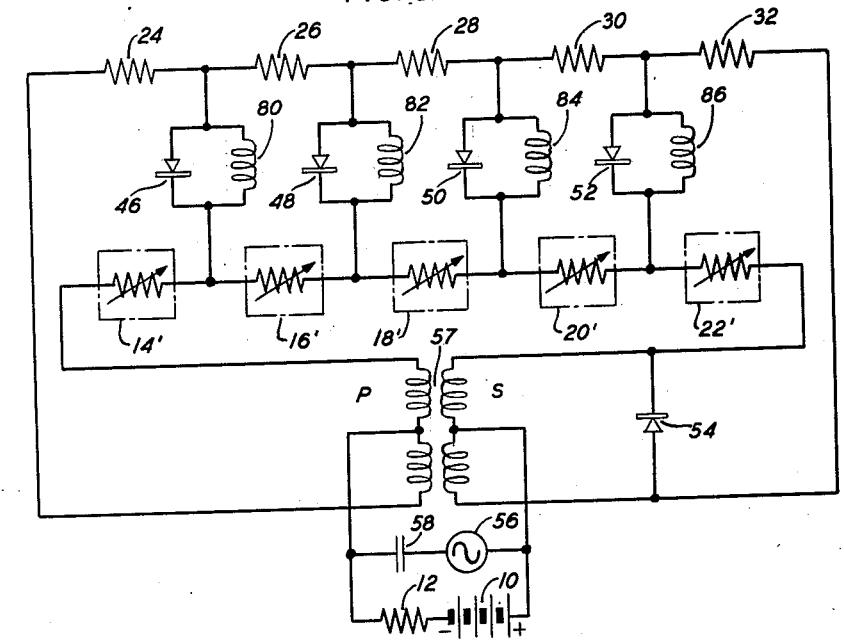
Fig. 6 is a schematic circuit arrangement of a five-stage ring circuit in accordance with the present invention using shunt-type variable resistance elements.

As pointed out in the earlier part of the specification, the shunt-type or voltage-controlled short-circuit-stable variable resistance units exhibit characteristics which are analogous to the characteristics of the series-type units comprising the circuits described with reference to Figs. 1 and 3. An embodiment of the ring circuit of the present invention which comprises shunt-type units is shown in Fig. 6, which will now be described in detail. In the schematic diagram shown in Fig. 6 of the drawings, the variable resistance units 14', 16', 18', 20', and 22' are of the shunt- or voltage-controlled type. Each of these elements may have a current-voltage characteristic such as shown by curve 184 of Fig. 7. As will be noted from this curve, this particular current-voltage characteristic is distinguished from the characteristic shown in Fig. 2 by the fact that as the voltage across the variable resistance unit is increased from zero, the current through the unit first increases until it reaches a maximum value at the reference point 112 and then decreases until it reaches a current minimum at the point 114, after which further increase of voltage causes increased current flow. It is thus seen that each of these elements possesses a region of negative resistance, as indicated by the numerals 112 and 114 on curve 184, which region is bounded by a first or low voltage region and a second or high voltage region of positive resistance. These units are distinguishable from the series-type units which have previously been described herein in that there is only one value of current corresponding to each value of voltage across the unit, whereas there may be as many as three appropriate values of voltage across the unit for a single value of current. This characteristic is substantially the reverse of the current-voltage characteristic of the series-type negative resistance elements.

Shunt-type variable resistance elements 14', 16', 18', 20', and 22' are connected in series to form a ring, the output from the unit 22' being fed back into the input of the unit 14' through transformer 57, the upper terminal of whose secondary coil is connected in series with the unit 22 and the upper terminal of whose corresponding primary coil is connected in series with the unit 14.

Shunting resistors 24, 26, 28, 30, and 32, each of which corresponds to one of the shunt-type negative resistance elements, 14', 16', 18', 20', and 22', are connected in series, the lower terminal of the primary coil of transformer 57 being connected to resistor 24 and the corresponding lower terminal of the secondary coil being connected to resistor 32. The junction between each of the pairs of negative resistance elements 14'—16', 16'—18', 18'—20', and 20'—22' is connected to the junction between the corresponding pair of resistors 24—26, 26—28, 28—30, and 30—32 through a unidirectional storage circuit comprising the corresponding one of inductors 80, 82, 84, and 86 in parallel with the respective one of the rectifying diodes 46, 48, 50, and 52, which are poled to control the counting of the circuit in the desired direction. The transformer 57, which has a mutual inductance equal to the self-inductance of the units 80, 82, 84, and 86, serves, in parallel with the diode 54, as the storage circuit, providing a path between the end negative resistance elements 14' and 22' and their respective shunting resistors 24 and 32.

A parallel energizing circuit including in one branch the direct-current source 10 in series with the current-limiting resistor 12 and in the other branch the alternating-current pulsing circuit 56 in series with the low impedance capacitor 58, in accordance with the teaching of application Serial No. 164,363, supra, is connected between the mid-points of the primary and secondary coils of the balanced transformer 57. The pulsing circuit 56 is poled in such a direction as to reduce the potential from the source 10.

The principles covering the choice of values for the components of the embodiment indicated in Fig. 6 are similar to those which have been already described with reference to the arrangements of Figs. 1 and 3. Because the variable resistance elements 14', 16', 18', 20', and 22' are short circuit stable, the connecting padding resistors 24, 26, 28, 30, and 32 preferably have a value which is not less than the maximum absolute value of negative resistance of the variable resistance elements, which is indicated with reference to the numeral 113 on the curve 184 of Fig. 7. The characteristic for the variable resistance units 14', 16', 18', 20', and 22', as shown by curve 184, has a point of maximum current flow 112 which will be designated hereinafter $I_{max}$ and a point 114 of minimum current flow which will be designated hereinafter $I_{min}$. The voltage across each of the variable resistance elements when current $I_{max}$ is flowing will be designated hereinafter $E_1$, and the voltage across each of the variable resistance elements when current $I_{min}$ is flowing will be designated $E_2$. The curve is further characterized by having three intervals, one in which the voltage across the negative resistance element is equal to or less than $E_1$, wherein the slope of the characteristic is positive, a second in which the voltage across the negative resistance element is greater than $E_1$ but less than $E_2$, wherein the slope of the characteristic is negative, and a third in which the voltage across the negative resistance element is greater than $E_2$, wherein the slope of the characteristic is again positive. As pointed out above, the point designated 113 on the curve 184 in the interval of negative slope is that at which the absolute valve of the slope is maximum. This maximum value of the slope will be designated $R_{max}$ as with reference to the series units discussed hereinbefore.

Figure 7:
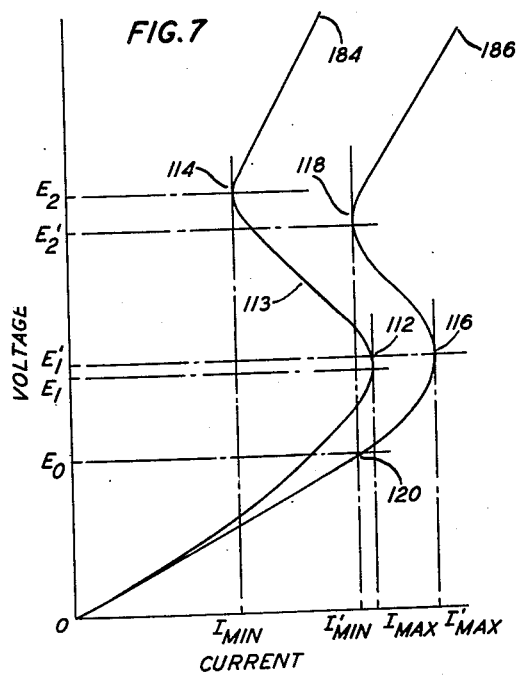
Fig. 7 is a graphic representation of the current-voltage characteristic of a typical shunt-type variable resistance element, to which reference will be made in the following detailed explanation.

With further reference to Fig. 6, however, the composite current-voltage characteristic of each variable resistance element and its corresponding parallel resistor is shown as curve 186 of Fig. 7. Because of the limitation that the parallel or shunting resistor is preferably of a value greater than $R_{max}$, these composite characteristics will also have maximum and minimum currents designated $$I'_{max}$$

and $$I'_{min}$$

respectively, which are indicated by the points 116 and 118 on the curve 184. The corresponding voltages are designated $E'_1$ and $E'_2$, respectively, while the voltage in the low voltage positive slope interval at which the current is equal to $$I'_{min}$$

as indicated by point 120, will be designated $E_0$.

The source of potential 10 and the limiting resistor 12 preferably have values within a range which is subject to the inequality:

$$\frac{E_{10}-2E'_1-(n-2)E_0}{II'_{min}} < R_{12} < \frac{R_{10}-nE'_1}{I'_{max}} \quad (2)$$

Here, as in the previous Equation 1, $n$ stands for the number of stages in the ring, which is five in the illustrative example shown, $E_{10}$ is the voltage of the source 10, and $R_{12}$ is the value of the resistor 12. As indicated, the units 46, 48, 50, 52, and 54 are diodes having a relatively low resistance in the conducting direction and as high a rectification ratio as is practicable. The inductors 80, 82, 84, and 86, which are connected in parallel with the respective diodes 46, 48, 50, and 52, have a value of inductance which is designed to give each mesh the time constant which is approximately equal to the time required for the variable resistance units 14', 16', 18', 20', and 22' to transfer from the high voltage conduction state to allow the low voltage conduction state. As previously stated, transformer 57 preferably has a mutual inductance which is equal to the self-inductance of the inductors 80, 82, 84, and 86. The pulse generator 56 is of a conventional form and is preferably capable of supplying voltage pulses of an amplitude approximately equal to the difference between $E_{10}$ and $nE_1$ and of duration which is approximately equal to the transfer time of the negative resistances 14', 16', 18', and 22'. The capacitor 58 is sufficiently large that its potential will not appreciably change when the charge of one pulse flows into it.

The manner of operation of this second type arrangement of ring countercircuit is similar to the previously described operation of the series-type variable resistance countercircuits disclosed in Figs. 1 and 3. Let us assume an initial condition in which the variable resistance element 18' is in its high potential state and the remaining elements 14', 16', 20', and 22' are operating in their low potential states. The net current through the inductors 80 and 86 and the transformer 57 will be zero, inasmuch as the currents on either side of them are the same. The net currents through the inductors 82 and 84 will, however, be different from zero because division of the total current in the mesh containing them differs from the division of current in the two adjacent meshes. When the pulse from the source 56 simultaneously reduces all of the variable resistors 14', 16', 18', 20', and 22' to the low potential condition, as indicated on the curve 186; one of the diodes 50 short-circuits its associated inductor, thus absorbing its stored magnetic energy. The diode 46, however, will be in its non-conducting direction, and, hence, the inductor 82 will drive a circulating current through the negative resistor 16' and its associated resistor 26. This circulated current will be in such a direction as to increase the normal current through the negative resistor; and, hence, when the pulse is removed, that particular unit will be in a condition to pass the maximum current $I_{max}$ before any of the others and, hence, will transfer to the high voltage state. The circuit condition will then be the same as the initial condition except that the high-current conduction state will have moved one stage around the loop. Thus, with each succeeding pulse from the source 56, the abnormal state steps another stage around the ring.

It is evident from the preceding description that the subject invention may be practiced through the use of a variety of circuit arrangements, some preferred ones of which have been described herein. It should be appreciated that there exist several suitable variable resistance units, either of the series or shunt type, which may be used with equal facility with those which have been incorporated herein in connection with the invention. In view of this, it is to be expected that variations of the invention which do not depart from the spirit and scope will present themselves to those in the related art.

What is claimed is:

1. An electrical countercircuit comprising in combination a plurality of variable resistance elements and a plurality of connected auxiliary resistance elements forming therewith a plurality of current-conductive paths, each of said variable resistance elements in combination with its auxiliary resistance element having a variational resistance characteristic including a predetermined range of electrical quantities within which either of two stable states obtains for a given condition and outside of which range of electrical quantities only a single stable state obtains for a given condition of operation, an energy storage impedance circuit interconnecting each pair of said current-conductive paths and including means for discriminating between the direction of current flow in said impedance circuit, an external network connected across said paths, said network including an electrical potential source, the magnitude of which when so connected is sufficient to give rise simultaneously to values within said predetermined range of electrical quantities for all of said variable resistance elements whereby one of said elements operates in one of said stable states and the remaining ones of said elements operate in the other of said stable states, and means comprising a generator of intermittent electrical pulses to momentarily change the effective value of said electrical potential source to give rise momentarily to electrical quantities outside of said predetermined range wherein all of said elements operate in the same stable state.

2. An electrical countercircuit comprising in combination a plurality of variable resistance elements and a plurality of connected fixed resistance elements forming therewith a plurality of current-conductive paths, each of said variable resistance elements in combination with its fixed resistor having a variational resistance characteristic including a predetermined range of electrical quantities within which either of two stable states obtains for a given condition of operation and outside of which range of electrical quantities only a single stable state obtains for a given condition of operation, an energy storage impedance circuit interconnecting each pair of said current-conductive paths, each of said energy storage circuits including means for discriminating between the direction of current flow in said path, an external network connected across said paths, said network including an electrical potential source, the magnitude of which when so connected is sufficient to give rise simultaneously to quantities within said predetermined range of electrical quantities for all of said variable resistance elements whereby one of said elements operates in one of said stable states and the remainder of said elements operate in said other stable state, and means comprising a generator of electrical pulses to momentarily change the effective value of said electrical potential source to give rise momentarily to electrical quantities outside of said predetermined range whereby all of said elements operate in the same stable state.

3. An electrical counter circuit comprising in combination a plurality of variable resistance elements and a plurality of connected auxiliary resistance elements forming therewith a plurality of current-conductive paths, each of said variable resistance elements in combination with its auxiliary resistor having a variational resistance characteristic including a predetermined range of electrical quantities within which either of two stable operating conditions obtain for a given set of conditions and outside of which range of electrical quantities only one stable operating condition obtains, an energy storage impedance circuit interconnecting said current-conductive paths and including means for discriminating between the direction of current flow in said paths, an external network connected across said paths, said network including an electrical potential source, the magnitude of which when so connected is sufficient to give rise simultaneously to quantities within said predetermined range of electrical quanties for all of said variable resistance elements whereby all but one of said elements operate in the same one of said stable operating conditions and that one operates in the opposing one of said stable operating conditions, and means to momentarily change the effective value of said electrical potential source to give rise momentarily to electrical quantities outside of said predetermined range whereby all of said elements are forced into the same stable state, said means comprising a generator of intermittent electrical pulses connected in a low impedance pulse transmission path that includes all of said variable resistance elements but which excludes said electrical potential source.

4. An electrical counter circuit comprising in combination a plurality of series-type negative resistance elements having a negative resistance range within which operation occurs in either of two stable states for a given set of conditions, each in series connection with a fixed resistor, the magnitude of which is less than the maximum negative resistance of said connected negative resistance elements, said fixed resistors and negative resistance elements forming a plurality of parallel current-conducting paths, an impedance circuit interconnecting the junction points of said fixed and said negative resistance elements in each of said paths, said impedance circuit comprising a storage element in series with unidirectional current-conducting means, an external circuit connected across and interconnecting said serially connected fixed and negative resistance elements, said external circuit comprising a current-limited source, said current-limited source when so connected being of sufficient magnitude to bring all of said series-type negative resistance elements within said predetermined range whereby one of said elements operates in one of said stable states and the remainder of said elements operate in the other of said stable states, and means to momentarily reduce the magnitude of said current-limited source to a value sufficient only to maintain said series-type connected resistance elements in their low voltage positive resistance range wherein operation occurs in the same stable state in each of said elements.

5. An electrical counting circuit in accordance with claim 4 wherein said storage element comprises a capacitor.

6. An electrical counting circuit in accordance with claim 4 wherein said unidirectional current-conducting means comprises a rectifier.

7. An electrical counting circuit in accordance with claim 6 wherein said unidirectional current-conducting means comprises a parallel circuit having a first branch which includes a rectifier in series with a resistor and a second branch which includes a resistor.

8. An electrical counter circuit in accordance with claim 4 in which said series-type negative resistance elements comprise transistors connected as two terminal impedance elements and characterized by a ratio of short-circuit collector current increments to corresponding emitter current increments which substantially exceeds unity.

9. An electrical counting circuit comprising in combination a plurality of shunt-type variable resistance elements in series connection, and a plurality of corresponding fixed resistors in series connection which are shunted across said negative resistance elements, a plurality of inductors, each connected between the junction of a respective pair of said variable resistance elements and the corresponding junction of a pair of said fixed resistors, each of said variable resistance elements together with its connected fixed resistor having a variational resistance characteristic including a predetermined range of current-voltage conditions within which either of two stable states obtains for a given set of conditions and outside of which operation in only a single stable state obtains for a given set of conditions, an external circuit connected across said serially connected shunt-type variable resistance elements and said fixed resistors, said external circuit including a source of potential, the magnitude of which when so connected is sufficient to create across said variable resistance units current-voltage conditions within said predetermined range of current-voltage conditions whereby one of said variable resistance units operates in one stable state and the other said variable resistance units operates in the other stable state, means to momentarily change the effective magnitude of said voltage source to create across said variable resistance elements current-voltage conditions outside of said predetermined range of current-voltage conditions, said means comprising a source of current pulses connected in circuit relation with said negative resistance units in series, and means comprising a unidirectional current-conductive element in circuit relation with each of said inductors for discriminating between the directions of current flow therefrom.

JAMES O. EDSON.
JOHN G. KREER, JR.

No references cited.